A. S. CAMBRIDGE.
GAS PRODUCER.
APPLICATION FILED NOV. 12, 1915.

1,318,644.

Patented Oct. 14, 1919.
2 SHEETS—SHEET 1.

INVENTOR
Allan Steward Cambridge
By Wallace White
ATT'Y.

A. S. CAMBRIDGE.
GAS PRODUCER.
APPLICATION FILED NOV. 12, 1915.
1,318,644.
Patented Oct. 14, 1919.
2 SHEETS—SHEET 2.
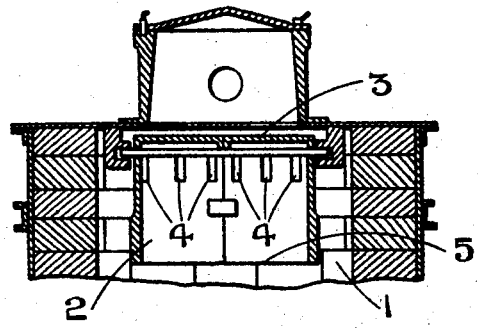
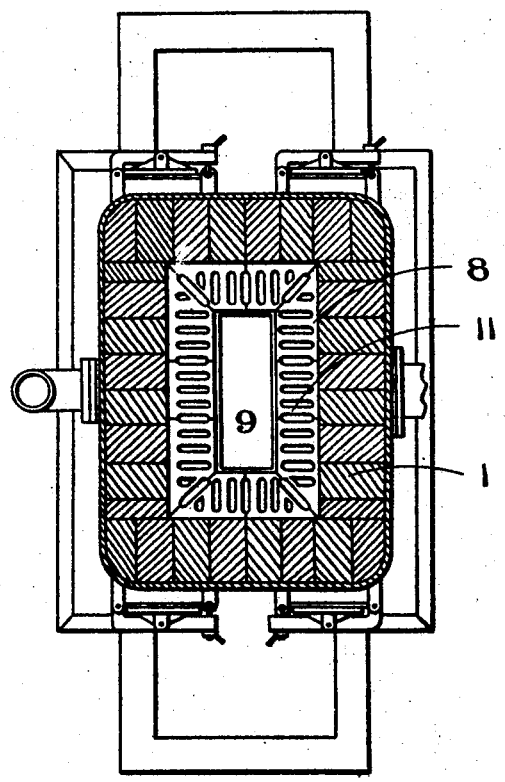
INVENTOR:
Allan Steward Cambridge
BY Wm Wallace White
ATTY.

UNITED STATES PATENT OFFICE.

ALLAN STEWARD CAMBRIDGE, OF AUCKLAND, NEW ZEALAND, ASSIGNOR TO LIONEL NELSON, OF WELLINGTON, NEW ZEALAND.

GAS-PRODUCER.

1,318,644.     Specification of Letters Patent.     Patented Oct. 14, 1919.

Application filed November 12, 1915. Serial No. 61,093.

*To all whom it may concern:*

Be it known that I, ALLAN STEWARD CAMBRIDGE, a subject of the King of Great Britain, residing at Auckland, New Zealand, have invented certain new and useful Improvements in Gas-Producers, of which the following is a specification.

This invention relates to apparatus for use in generating or producing gas to be supplied to internal combustion engines and for heating and for like purposes, and it consists in so constructing said apparatus that the efficiency thereof is greatly increased while the cost of maintenance is comparatively little.

Its object is to provide means for distributing air evenly across and through the fuel space in the generator and insuring a practically perfect combustion of the tarry vapors and rendering them innocuous, and also to provide means for insuring that the tarry vapors are driven off before the fuel enters the incandescent zone, and for insuring that a considerable portion of the tarry vapors pass down through the central pipe hereinafter described, and also means for supporting the fuel. It also provides means for the removal of spent fuel, ashes, and other refuse therefrom, without permitting the ingress of air into, or the egress of gas out of same during the removal of said refuse.

In the drawings accompanying this specification:—

Fig. 2 is a plan thereof.

Fig. 3 is a section through the top of the generator at right angles to the section shown in Fig. 1.

Figure 1:
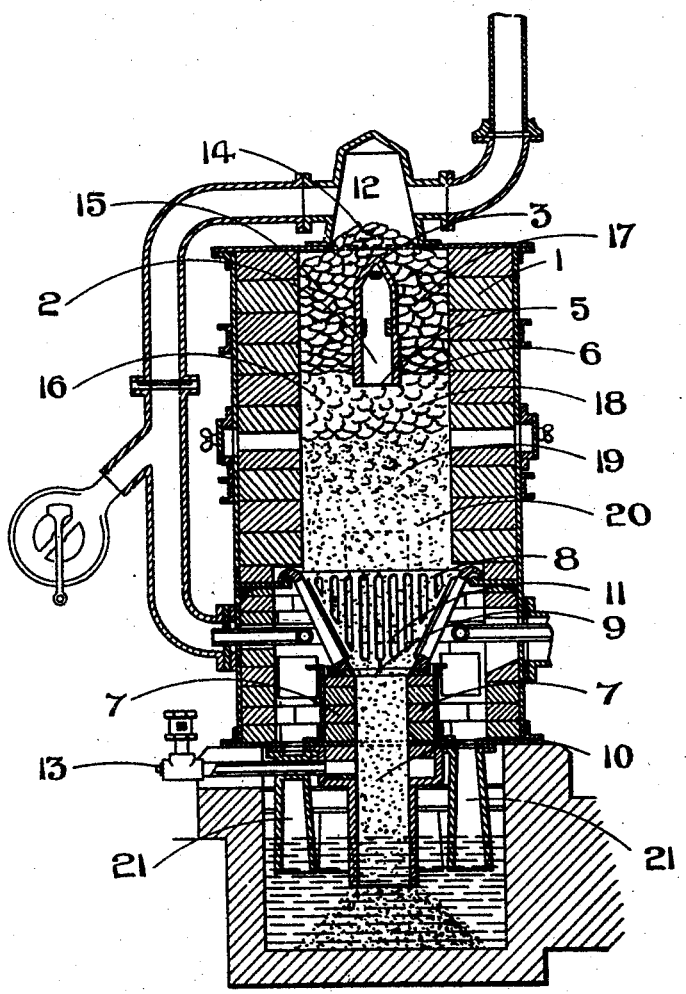
Figure 1 is a vertical section illustrating the invention.

According to the invention the generator (1) is of substantially oblong section, that is to say with a greater length than breadth, and preferably rectangular or oval, with a special form of pipe or air distributer (2) constructed similarly oblong in section so that the sides of the pipe are as nearly as practicable equidistant from the sides of the generator. This pipe (2) preferably has its upper end covered with a reversed V-shaped roof (3) and near the top of its sides it is provided with air passages or ports (4) to admit air within the pipe. In the case where the roof is not used no air ports are required. It has a large outlet (5) at its lower end which allows air to pass through it at a low rate so that no intense local heat is caused which forms clinkers.

The pipe (2) is built of metal or of any suitable refractory material and is preferably suspended from the top of the generator so that it is free to expand in any direction and it is of sufficient depth to reach to or a little below the surface (6) of the incandescent mass.

Brick pedestals (7), (7), support a cone or prism shaped grate (8) which is so constructed as to rest on the pedestals to take the weight of the fuel off the grate as much as possible. The grate has an open bottom, through which clinker falls or may be poked down and thence through a discharge pipe or lute (10) and can readily be withdrawn preferably through a water lute which prevents air entering the bottom of the generator and mixing with the gas. Any ashes that fall through the grate pass down through the ash lutes (21) into the water seal. The grate (8) being of the shape shown forms a larger area than the usual flat grate facilitating the passage of gas out through between the bars (11). The distillation zone (17), the combustion zone (18), the decomposition zone (19), and the ash zone (20) are shown approximately in their respective positions. The other portions of the apparatus are the same as heretofore.

The invention is operated as follows:

Air or air and steam is admitted at the top (12) of the generator (1) if a down draft only is used, and at the top (12) and bottom (13) if a combined up and down draft is used; this air is to support combustion. In the process of this combustion the tar is driven off in the form of vapor from the fuel at the top (14) of the fuel space (15) in the generator (1) and is drawn or driven through the bed (16) of incandescent fuel beneath. The tarry vapors meet in this incandescent fuel with a supply of air or air and steam which is supplied through the special pipe (2) above described at the depth above referred to which insures the combustion of these tarry vapors and renders them innocuous.

The tarry vapors are partially driven off upward under the slight pressure due to the heat in the combustion zone and mingle with the air and pass down with it through the pipe (2) above described, as this is the path of least resistance, thus insuring thorough mixing before entering the incandescent zone and causing a very efficient combustion. The tarry vapors that do not pass through this central air pipe (2) pass down with air outside the pipe (2) into the incandescent zone and are there consumed.

Having now described my said invention, what I claim as new and desire to secure by Letters Patent is:—

1. A gas producer comprising a generator body, an air supply pipe freely suspended within the body from diametrically opposite sides thereof only to permit expansion thereof in any direction.

2. A gas producer comprising a generator body rectangular in cross section, an air distributing member rectangular in cross section, and means for suspending said member centrally within the body from diametrically opposite sides thereof only to permit expansion thereof in any direction.

3. As an article of manufacture, an air distributer for gas generators comprising a body portion rectangular in cross section and open at its lower end, an inverted V-shaped roof for the upper end thereof, said roof being provided with a plurality of air admission openings in the inclined portions thereof, and means for freely suspending said distributer in operative position.

4. As an article of manufacture, an air distributer for gas generators comprising a body portion open at its lower end, an inverted V-shaped roof for the upper end thereof, said roof being provided with a plurality of air admission openings in the inclined portions thereof, and means projecting from diametrically opposite sides of the distributer for freely suspending the same in operative position.

In testimony whereof I have affixed my signature in presence of two witnesses.

ALLAN STEWARD CAMBRIDGE.

Witnesses:
PERCY BRUCE ST. JOHN,
ANDREW JOHN PARK.

Copies of this patent may be obtained for five cents each, by addressing the "Commissioner of Patents, Washington, D. C."